3,523,225
REGENERATIVE CAPACITOR
Paul H. Netherwood, Williamstown, Mass., Herbert C. Craig, Stamford, Vt., Ernest B. Rondeau, North Adams, Mass., and Raynor Linzey, Stamford, Vt., assignors to Sprague Electric Company, North Adams, Mass., a corporation of Massachusetts
Filed Mar. 11, 1969, Ser. No. 806,223
Int. Cl. H01g 3/215
U.S. Cl. 317—258                                                    4 Claims

ABSTRACT OF THE DISCLOSURE

A regenerative capacitor has a first and second composite of a polyethyleneterephthalate (Mylar) film having a thin coating of a cellulose lacquer on one side thereof and a metal electrode coating on the cellulose lacquer. The first and second composites are convolutely wound in capacitative, extended electrode arrangement. Metal masses are in electrical communication with all of the end edges of the extended portions of the electrodes.

BACKGROUND OF THE INVENTION

This invention is concerned with a regenerative capacitor and more particularly with a capacitor employing a composite dielectric.

In metallized film capacitors having composite dielectric layers, the clearing action in which the melted metallized electrode melts away from the point of breakthrough or short, causes the distance through which the arcing current travels to become too long and the shorting between electrodes is ended. The problems associated with dealing with shorts by the clearing action of the metallized electrodes is the deterioration of adjacent materials which in turn triggers further breakdowns and tends to produce a catastrophic or avalanche result.

The shorter the time it takes the clearing action to terminate the breakdown and close off the shorting current, the less the likelihood of accompanying destruction leading to a chain reaction breakdown. It is desirable to terminate the breakdown current and end the shorting quickly with as small an area of destruction as possible, at higher voltages. An ideal dielectric for regenerative capacitors would be one which could resist completely the heating affect of the short during vaporization of the shorted area. Unfortunately no such ideal dielectric exists. In order to achieve a dielectric system which has all of the characteristics desirable in a regenerative capacitor, it has been necessary to use a composite of at least two dielectric films so as to obtain in the dielectric system good electrical characteristics as well as the best possible physical and chemical reaction to the effects of the heat produced.

Certain prior art investigators have classified dielectric films into two broad classes. These two broad classes are a rough indication as to whether or not the members of a class can be completely converted to stable nonconducting oxidation products for example $CO_2$ and $H_2O$. The principal determinant as to whether or not an organic film will, on subjection to heat yield stable oxidation products, is the amount of oxygen available in the molecule necessary to convert the compound to nonconducting oxidation products. The two classes of dielectric materials are determined by calculating the ratio of oxygen necessary to completely convert the dielectric material to $CO_2$ and $H_2O$ versus the actual oxygen available in the dielectric. This ratio is called the oxidation balance. For example, in the case of polycarbonate having the formula $$(-C_6H_4C(CH_3)_2-C_6H_4-OCO_2-)_n$$

there are 16 carbon atoms and 14 hydrogen atoms. There would be required 39 atoms of oxygen for each repeated polymer group to convert it to $CO_2$ and $H_2O$. Since there are only three atoms of oxygen available, the oxidation balance is 7.7% i.e. $3 \div 39 \times 100$. The prior art teaches that if the oxidation balance is greater than 10%, then the dielectric material is a good choice for regenerative capacitors since the oxidation products are stable, it has a comparatively low degree of carbonization and a comparatively high insulation value. In short, it would have good clearing characteristics. On the other hand, if the oxidation balance is less than 10% the oxidation products are unstable, carbonization is high and the products will have a comparatively low insulation value which can cause short circuiting.

Among the dielectrics taught as having an oxidation balance of greater than 10%, are: cellulose acetate, ethylcellulose and polyethyleneterephthalate (Mylar). Among the dielectrics taught as having an oxidation balance of less than 10% are: polycarbonate, polystyrene, polyethylene and polyvinylcabazol. The prior art teaches that this second class of dielectrics, i.e. oxidation balance less than 10%, cannot be employed alone for regenerative capacitors despite their good dielectric properties and high temperature stability. It is, therefore, taught to combine these materials with dielectrics of the first class, i.e. those having an oxidation balance of greater than 10%, by coating a member of the second class with a member of the first class.

If one takes the above teachings at face value it would lead one skilled in the art to employ dielectrics of the first class such as cellulose acetate and Mylar alone as dielectrics since they appear to have all of the desirable characteristics for a regenerative capacitor. However, it has been determined that this apparently only holds true for comparatively low energy capacitors. Thus, for high energy capacitors the art does not teach any single suitable dielectric having regenerative properties nor have the suggested composite dielectrics solved the problem. In addition, there are particular problems in making end connections to the capacitor when utilizing Mylar as the dielectric.

It is an object of this invention to provide a capacitor employing a composite dielectric.

It is another object of this invention to provide a capacitor particularly suited for high energy capacitance.

It is yet another object of the invention to present a capacitor employing a composite dielectric which facilitates the obtaining of a strong and continuous end connection.

These and other objects of this invention will be more readily understood in the light of the following description taken together with the accompanying drawing in which:

FIG. 1 represents a cross-section of a part of a cleared prior art capacitor.

FIG. 2 represents a cross section of a part of a cleared capacitor of the present invention.

SUMMARY OF THE INVENTION

In accordance with the invention, there is presented a regenerative capacitor having a first and a second composite each consisting essentially of a polyethyleneterephthalate (Mylar) film having a thin coating of a cellulose lacquer on one side thereof and a metal electrode coating disposed on the cellulose lacquer. The composites are convolutely wound in capacitative, extended electrode arrangement. Metal masses are in electrical communication with all of the end edges of the extended portion of said electrodes.

DETAILED DESCRIPTION OF THE INVENTION

Example

Figure 1:
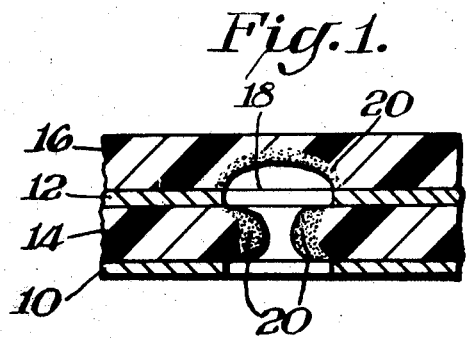
FIG. 1 shows a part of a metallized Mylar capacitor having electrodes 10 and 12 and Mylar films 14 and 16. Region 18 represents a cleared area resulting from a short circuit between electrodes 10 and 12. Areas 20 represent carbonized Mylar caused by the heat of the short circuit.

A capacitor of the present invention is formed as follows:

A solution of a commercially available cellulose acetate in acetone is prepared. The concentration of cellulose acetate in acetone must be such that a thin, continuous film of cellulose acetate can be formed on a substrate upon evaporation of the acetone. Normally the percent cellulose acetate in the solution will range from 4 to 35%.

The cellulose acetate lacquer is placed in a shallow receptacle and a rotating roller positioned in the lacquer so that a quantity will be picked up by the roller. Excess lacquer is metered off the first roller by a second roller in contact therewith. A film of polyethyleneterephthalate approximately 0.5 mil thick and about 3 inches wide is coated on one side with the lacquer from the first roller. The film is subjected to heat to evaporate the acetone and deposit a film of cellulose acetate approximately 0.05 mil thick on one side of the polyethyleneterephthalate film. An aluminum electrode approximately 200 A. thick is vapor-deposited on the cellulose acetate side of the film by conventional means.

A series of six capacitors having a rating of 2 microfarads are prepared by convolutely rolling two so-prepared film-electrode composites in extended electrode arrangement, in a manner well-known to the art. The ends of the capacitor section are sprayed with a molten zinc-aluminum eutectic to facilitate firm electrical connection to the electrodes. Metal leads are then soldered to the eutectic.

For comparison purposes a second series of six capacitors, having a rating of 2 microfarads is prepared from polyethyleneterephthalate film having the same dimensions as above and aluminized to the same thickness and in the same maner as above. The capacitors are constructed as above so that the only difference between the two groups is the presence of the cellulose acetate in the first group.

Also for comparison purposes, a third series of six capacitors having a rating of 2 microfarads is prepared from kraft paper 3–.5 mil thick, 3 in. wide and having a .05 mil coating of cellulose acetate on one side thereof. The acetate side of the paper is aluminized to the same thickness and in the same manner as above. The capacitors are constructed as above so that the only difference between this group and the first group is use of paper instead of Mylar in this group.

The three groups are then subjected to slowly increasing voltage. By approximately 1000 volts/mil, clearing is audible in all the groups and a temporary deflection is observed on the voltmeters. After stabilization, the voltage is further increased, with random clearing occurring in the units of all the groups. By about 1500 volts/mil all of the units of the third group i.e. the paper-cellulose acetate group are completely shorted out. By about 2500 volts/mil, all of the units of the second group, i.e. the metallized polyethyleneterephthalate units, are completely shorted out. The voltage to the first group i.e. the polyethyleneterephthalate-cellulose acetate units, is continued up to about 10,000 volts/mil before failure of any unit occurs.

Figure 2:
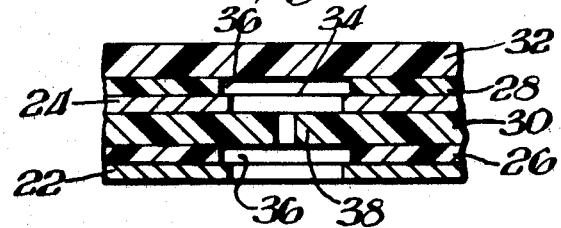
FIG. 2 represents a part of a capacitor section of the present invention having electrodes 22 and 24 deposited on a composite dielectric formed of cellulose acetate coatings 26 and 28 on Mylar films 30 and 32. Region 34 represents a cleared region caused by a short circuiting between electrodes 22 and 24. Region 66 illustrates the extent to which the cellulose acetate receded during the clearing action and region 38 illustrates the extent to which the Mylar resisted receding during the clearing action.

In order to attempt to determine why there is such an outstanding difference in stability between units employing metallized paper-cellulose acetate, plain metallized Mylar and metallized Mylar-cellulose acetate, the cleared regions of these units were carefully examined. As illustrated in the drawing herein, (see FIG. 1) a typical cleared region in a metallized Mylar capacitor will have part of at least one electrode removed leaving a rough, irregular hole having a radius anywhere from 10–100 times the opening in the Mylar. The edges of the Mylar of the cleared region appears to be severly carbonized and decomposed. The metallized paper-cellulose acetate units show basically the same effect at their cleared regions. Units of the present invention, illustrated by FIG. 2, shows effective clearing, where the opening in at least one electrode is also from about 10–100 times the opening in the Mylar, but there is no evidence of degradation of the Mylar except for the small hole therein. Furthermore, the cellulose acetate film appears to have been vaporized or removed to even a greater extent than the electrode. Whatever the precise mechanism, the combination of the cellulose acetate with the Mylar appears to permit an effective clearing action which does not deleteriously affect the Mylar which remains. Moreover the composite dielectric confines the clearing action to a region between adjacent Mylar films. The extent of stability, particularly for high energy capacitors, was unexpected and unpredicable.

In addition to this dramatic difference in the stability of the three groups of capacitors, a considerably higher current density per linear inch of electrode end connection can be obtained with the inventive capacitor without damage to the ends of the unit than with either of the other type units. The current density is from 3–10 times that obtained with the other type units. There is reason to believe that this considerable improvement results from the far better bond that exists between the metallized cellulose acetate and the polyethyleneterephthalate than exists between merely metal and polyethyleneterephthalate. It is not completely understood why the inventive units are so superior in this respect over the metallized paper-cellulose acetate units.

The bond between the metal and the cellulose acetate is so good that it precludes the use of a cellulose acetate film on both sides of the metallized layer. If cellulose acetate is placed on both sides of the metallized layer, so that only the metal edge were exposed, an extremely poor end connection is obtained, resulting in an inferior current density. In accordance with the present invention, because only a single layer of cellulose acetate is employed in each composite of Mylar, cellulose acetate and metal electrode; when one composite is convolutely wound in capacitative, extended electrode arrangement with another identical composite, excellent end connection can be accomplished. The Mylar side of the electrode is only press-contacted to the electrode and this apparently permits a firm, unobstructed connection along the entire edge of extended electrodes.

The cellulose lacquer can have a thickness ranging from .01 to 0.5 mil. The Mylar can range in thickness from .1 to 1.5 mils. The electrode thickness can range from 50 to 500 A. It is preferred that the cellulose lacquer thickness be from 5–20% of the thickness of the Mylar.

While cellulose acetate has been employed in the specific example it is to be understood that other equivalent derivatives of cellulose can be employed as the lacquer film herein. Thus, the term "a cellulose lacquer" is intended to include films formed from a solvent solution of cellulose acetate, ethylcellulose, cellulose acetate sorbate, cellulose acetate butyrate, cellulose nitrate, benzyl cellulose, etc.

It should also be understood that the basic capacitor structure can be modified so as to include between each metallized cellulose lacquer-Mylar composite, an additional film of paper or Mylar. This will further increase the breakdown voltage between electrodes and, in the case of additional paper films, the unit can be impregnated with a liquid dielectric which may solidify or remain liquid.

The electrodes can be formed by conventional and well-known techniques and may be of aluminum, lead, tin or zinc. The metal end contact placed in electrical communication with the end edges of the extended portion of the electrodes can be any single metal, an alloy or a eutectic. Zinc-aluminum eutectic or a lead-tin solder are preferred. By the language "convolutely wound in capacitative, extended electrode arrangement" is meant that the two composites are superimposed with their metallized surfaces each facing in the same direction with a metal free margin on opposite sides and convolutely rolled so that contact can be made to each extended electrode.

It should be understood that the above-described embodiments of the invention are for purposes of illustration only and that modifications may be made without departing from the spirit of the invention and that this invention should be limited only by the scope of the appended claims.

What is claimed is:

1. A regenerative capacitor comprising a first and a second composite each consisting essentially of a polyethyleneterephthalate film having a thin coating of a cellulose lacquer on one side thereof and a metal electrode coating disposed on said cellulose lacquer; said first and second composite being convolutely wound in capacitative, extended electrode arrangement; and metal masses in electrical communication with all of the end edges of the extended portion of said electrodes.

2. The capacitor of claim 1 wherein said cellulose lacquer film is a member of the group consisting of cellulose acetate, ethylcellulose, cellulose acetate sorbate, cellulose acetate butyrate, cellulose nitrate and benzyl cellulose.

3. The capacitor of claim 2 wherein said cellulose lacquer film is cellulose acetate.

4. The capacitor of claim 3 wherein said metal electrode coating is aluminum.

References Cited
UNITED STATES PATENTS 3,237,067   2/1966   Schill _____ 317—258 X ELLIOT A. GOLDBERG, Primary Examiner U.S. Cl. X.R.

317—260

PO-1050
(5/69)

UNITED STATES PATENT OFFICE
CERTIFICATE OF CORRECTION

Patent No. 3,523,225      Dated August 4, 1970

Inventor(s) Paul H. Netherwood, et al

It is certified that error appears in the above-identified patent and that said Letters Patent are hereby corrected as shown below:

```
Column 3, line 10, change "Region 66" to -- Regions 36 --
Column 3, line 52, change "maner" to -- manner --
Column 3, line 58, change "3-.5" to -- .3-.5 --
Column 4, line 14, change "severly" to -- severely --
Column 4, line 18, change "shows" to -- show --
```

SIGNED AND
SEALED
OCT 20 1970

(SEAL)
Attest:

Edward M. Fletcher, Jr.
Attesting Officer

WILLIAM E. SCHUYLER, JR.
Commissioner of Patents